UNITED STATES PATENT OFFICE.

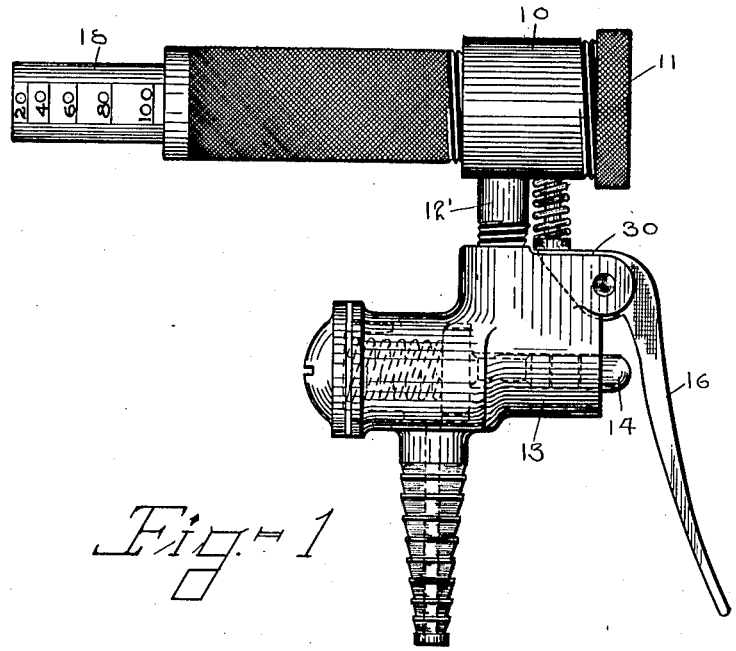
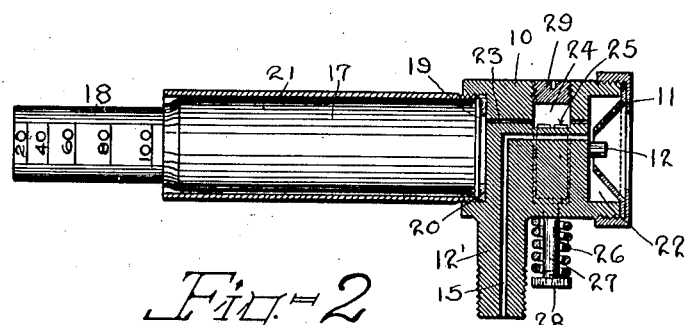
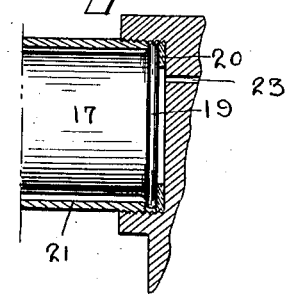
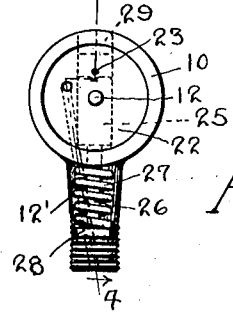

HENRY JUNGJOHANN, OF DAVENPORT, IOWA.

TIRE-PRESSURE GAGE.

1,261,546.        Specification of Letters Patent.        Patented Apr. 2, 1918.

Application filed August 17, 1917. Serial No. 186,749

*To all whom it may concern:*

Be it known that I, HENRY JUNGJOHANN, a citizen of the United States of America, and a resident of Davenport, county of Scott, and State of Iowa, have invented certain new and useful Improvements in Tire-Pressure Gages, of which the following is a full and clear specification.

This invention has relation to that type of tire pressure gages which are combined with an invention whereby the tire may be inflated from an air line or pump at the same time the pressure in the tire is taken, as particularly exemplified in my former Patent 1,208,162, dated December 12, 1916; and the object of this invention is to provide a simple contrivance whereby the gage spring will be relieved of the sudden shock that it would receive if the pressure from the air line were directed suddenly into the gage, thereby greatly prolonging the life of the gage, as more fully hereinafter set forth.

In the drawing—

Figure 1 is a side elevation of a device embodying my invention;

Fig. 2 is a longitudinal sectional view taken through the gage member on the offset line 2—2 of Fig. 3;

Fig. 3 an end elevation of the gage member, the screw cap and tire-nipple-gasket being removed; and Fig. 4 is a detail sectional view, enlarged, of the clamping means for the gage.

Referring to the drawing annexed by numerals, 10 designates the body of the gage, at one end of which is arranged the usual gasket 11 for making an air-tight connection with the tire-nipple, and a pin 12 for opening the valve in the tire-nipple. Connected to one side of the body portion 10 is a short tube 12', to which is connected a valve chamber 13, in which is arranged a normally closed valve 14 which controls the passage of the air from the air line or pump to the pipe or nipple 12', in the same manner as indicated in my above-mentioned former patent. A port 15 extends through the nipple or tube 12' into the body 10 and exits at a point adjacent to the opening pin 12, whereby, by opening valve 14, air from the air line or pump will be admitted to the tire. The valve 14 is adapted to be opened by hand lever 16, as in my former patent.

The pressure gage consists of the usual cylinder 17 which contains the usual coil-spring (not shown), which spring tends normally to retract the usual gage bar 18. The cylinder 17 is provided at its base with an annular flange 19 which is clamped against a washer 20 (resting against the body 10) by means of a cylinder 21 screwed to said body 10, the cylinder 21 being substantially the length of the cylinder 17 of the gage to thereby receive and support or brace the same. By this arrangement, the gage is rendered readily detachable from the tire-nipple-engaging body 10, so that from time to time a new, standard gage may be substituted for a worn-out gage or one in which the spring needs recalibration.

The tire-nipple-engaging washer 11 is inclosed in a chamber 22, and this chamber is connected to the pressure chamber of the gage by a port 23 extending longitudinally through the body member 10 and intersected by a transverse passage 24. In this passage 24, a valve 25 of the plunger type is adapted to reciprocate to close and open said port 23, this valve 25 being normally held down to the bottom of the passage 24 to thus normally keep the passage 23 open, the means for thus normally holding this valve open consisting of coil-spring 26 which surrounds a tail-pin 27 affixed to the valve 25 and extending laterally through the wall of the body 10, the outer end of the spring 26 bearing against a head or nut 28 screwed to the end of the tail-pin 27. For convenience in inserting the valve 25 into the passage or chamber 24, I provide the end of the passage opposite the tail-pin 27 with a removable screw plug 29. The end of the valve-pin 27 is arranged adjacent to the inwardly-extending nose 30 of the lever 16, so that said nose 30 engages under the pin in such fashion that when the lever 16 is operated in a direction to open valve 14, the valve 25 will be moved in a direction to close the port 23. In the construction hereinbefore described, it will be observed that, if it be simply desired to take the pressure of the tire, the device is slipped onto the tire-nipple, whereupon the pin 12 will open the valve of the nipple and let the air from the tire pass into the gage and thus indicate the pressure in the tire in the usual manner. When, however, it is desired to inflate the tire, the operator grasps the handle 16 and moves it so as to first move valve 25 to close port 23 (thus cutting off the gage entirely from the chamber 22); then, by continued movement of handle 16, the charging valve 14 is opened to thus admit air from the air line into the chamber 22, whence it passes in the usual manner into the tire. In this way, the gage member is protected from shocks that would occur were the heavy pressure of the air line permitted to pass directly and suddenly into the gage. During the inflation of the tire from the air line, the operator may momentarily from time to time relieve the valve lever 16 from pressure and thus permit valve 25 to open and thereby allow the pressure in the tire to be indicated in the gage. The proportions of the parts will be such, however, that the valve 14 will always close the air line before the port 23 is opened, and it is desirable also that port 23 shall be of less cross-sectional area than the air line port 15 so as to in a measure choke the admission of air to the gage, to thereby insure a sufficiently slow movement of the air into the gage to avoid sudden shocks to the spring thereof.

The nature and scope of the invention having been thus indicated and its preferred embodiment having been specifically described, what is claimed as new is:

1. In combination, a tire-nipple-engaging member, an air gage connected thereto, an air line connection to said member, this connection being provided with a normally closed valve, said member being provided with a port leading from the nipple-engaging end thereof to the interior of the gage, a valve controlling this port and means for normally holding this valve open, and a single means for closing this last-named valve and for subsequently opening the air line valve.

2. In combination, a tire-nipple-engaging member, an air gage connected thereto, an air line connection to said member, this connection being provided with a normally-closed valve, said member being provided with a port leading from the nipple-engaging end thereof to the interior of the gage, a valve controlling this port and means for normally holding this valve open, and means for closing this last-named valve and for subsequently opening the air line valve, said means consisting of a single manually-operable lever pivoted at a point between its ends adapted to first close the gage-protecting valve and to subsequently open the air line valve, for the purpose set forth.

3. In combination, a tire-nipple-engaging member, an air gage connected thereto, an air-line connection to said member, said air-line connection being provided with a normally closed valve, said member being provided with a port leading from the nipple-engaging end thereof to the interior of the gage, a gage-protecting valve controlling said port and means for normally holding this valve open so that the gage is at all times ready for use as a tire gage, said member being also provided with another port leading from the air-line connection to the nipple-engaging end of the gage, and a single means for closing the gage-protecting valve and subsequently opening the air-line valve.

In testimony whereof I hereunto affix my signature.

HENRY JUNGJOHANN.